United States Patent
Ma

(10) Patent No.: US 9,582,151 B2
(45) Date of Patent: Feb. 28, 2017

(54) METHOD AND APPARATUS FOR SHARING USER INFORMATION IN BROWSERS OF A MOBILE TERMINAL

(71) Applicant: HUIZHOU TCL MOBILE COMMUNICATION CO., LTD., Huizhou, Guangdong (CN)

(72) Inventor: Ling Ma, Huizhou (CN)

(73) Assignee: TCL MOBILE COMMUNICATION CO., LTD. HUIZHOU, Guangdong (CN)

(*) Notice: Subject to any disclaimer, the term of this patent is extended or adjusted under 35 U.S.C. 154(b) by 217 days.

(21) Appl. No.: 14/387,937

(22) PCT Filed: Dec. 21, 2012

(86) PCT No.: PCT/CN2012/087130
§ 371 (c)(1),
(2) Date: Sep. 25, 2014

(87) PCT Pub. No.: WO2013/143331
PCT Pub. Date: Oct. 3, 2013

(65) Prior Publication Data
US 2015/0040067 A1    Feb. 5, 2015

(30) Foreign Application Priority Data
Mar. 28, 2012  (CN) .......................... 2012 1 0086271

(51) Int. Cl.
G06F 9/00         (2006.01)
G06F 3/0482       (2013.01)
(Continued)

(52) U.S. Cl.
CPC ........ G06F 3/0482 (2013.01); G06F 3/04847 (2013.01); G06F 17/30861 (2013.01); G06F 17/30899 (2013.01)

(58) Field of Classification Search
CPC ............... G06F 17/2247; G06F 17/227; G06F 17/2264; G06F 17/30905; G06F 17/30896
(Continued)

(56) References Cited

U.S. PATENT DOCUMENTS 7,324,997 B2    1/2008  Yamada
2005/0021626 A1 1/2005  Prajapat et al.
(Continued)

FOREIGN PATENT DOCUMENTS

CN    1201193    12/1998
CN    1403964    3/2003
(Continued)

OTHER PUBLICATIONS

Webroot SecureAnywhere Passwords User Guide, Jan. 2012, Webroot Software, Inc, 1-42.*
Password Exporter, Sep. 3, 2010, Mozilla, All pages.*

*Primary Examiner* — Scott Baderman
*Assistant Examiner* — Hassan Mrabi
(74) *Attorney, Agent, or Firm* — Kirton McConkie; Evan R. Witt

(57) ABSTRACT

A method for sharing user information in browsers of a mobile terminal is disclosed in the present invention and comprises steps of: receiving a second operating command for importing the user information to a second browser; executing a first operating command for exporting the user information from the first browser in accordance with the second operating command for importing the user information to the second browser, and the first operating command is a command for exporting the user information from the first browser.

6 Claims, 11 Drawing Sheets

(51) Int. Cl.
*G06F 17/30* (2006.01)
*G06F 3/0484* (2013.01)

(58) Field of Classification Search
USPC .............................. 715/200, 239, 733, 810
See application file for complete search history.

(56) References Cited

U.S. PATENT DOCUMENTS

| | | | |
|---|---|---|---|
| 2007/0271505 A1* | 11/2007 | Dandekar | G06F 17/30861 715/234 |
| 2008/0301057 A1* | 12/2008 | Oren | G06F 21/31 705/71 |
| 2009/0083286 A1 | 3/2009 | Tamura | |
| 2010/0306658 A1 | 12/2010 | Ariyoshi | |

FOREIGN PATENT DOCUMENTS

| | | |
|---|---|---|
| CN | 1774707 | 5/2006 |
| CN | 101310261 | 11/2008 |
| CN | 101393556 | 3/2009 |
| CN | 102662767 | 9/2012 |

\* cited by examiner

METHOD AND APPARATUS FOR SHARING USER INFORMATION IN BROWSERS OF A MOBILE TERMINAL

FIELD OF THE INVENTION

The present invention relates to a field of mobile terminal technology, and more particularly relates to a method and apparatus for sharing user information in browsers of a mobile terminal.

BACKGROUND OF THE INVENTION

With the increasing of the development of mobile telecommunication technique and people's living standard, the usage of many different kinds of the communication terminals, such as cellular phone, is more and more popular. The cellular phone has become a significant communication tool. With the continuous progress of the technology, the function of the cellular phone is increased day after day and not only includes a communication function but also includes a music playing function, an online chatting function and so on.

Nowadays, the cellular phone connecting to the Internet has become a trend, and the browser of the mobile phone is a portal to connect to the Internet and has become more and more popular. The competition of the browser of the cellular phone in the market is becoming increasingly fierce, so the function and the user experience in the browser of the cellular phone are become better and better. Most of the functions in the browser of PC (Personal Computer) are gradually included in the browser of the cellular phone.

The browser in the present day is not only a tool to decode HyperText Markup Language (HTML) but also focuses on user convenience. For example, the function of the popular GPS (Global Positioning System) is more and more intelligent. Processing is performed by using a cache, thus the loading speed of the web pages can be accelerated. A password memorizing function for user convenience is further included, so the user is not requested to reenter the username and the password every time when the user logs in the same web site. The performance of the browser is greatly improved by including the above functions.

However, the compatibility and the interactivity with other browsers in the browser of the PC or the cellular phone are easily ignored when trying to improve the performance itself.

Especially in the era of smart phones, the program installation of the cellular phone is as convenient and easy as that of the PC. As a result, it is not unusual for a user to have many browsers installed in one cellular phone. In addition to the basic functions of the cellular phone such as dialing and connecting to the Internet, many cellular phone venders preinstall two or three browsers when the cellular phone is released in the market, especially as there are more and more different kinds of browsers in the present time. Therefore, the user can have many different options and can choose any one of the browsers in accordance with the advantages thereof.

Although it is much convenience for the user to use the browsers, it would also cause some inconveniences for the user. For example, when the user uses many different browsers, the compatibility and the interactivity between browser and browser are ignored. If the user is browsing a web site, such as Facebook, Twitter and so on, which is requested to log in, by a default browser in Android, the default browser in Android will memorize the account and the password of the user. But the user is requested to input the account and the password when the user uses a different browser, such as Opera, Firefox or the like, to browse the same web site another day. If the user visits such websites frequently, it is not convenience for the user.

Therefore, the current technology is requested to improve and develop.

SUMMARY OF THE INVENTION

One main technical problem solved in the present invention is to provide a method and apparatus for sharing user information in browsers and a mobile terminal in accordance with the drawbacks in the current technique. It is to accomplish two or more browsers can share the user information.

The technical propose provided in the present invention to solve the technical problem is:

a method for sharing the user information in the browsers of the mobile terminal, and the method comprises the following steps: A. receiving a first operating command for exporting user information from a first browser and the user information is stored in the first browser; B. executing a second operating command to control the user information exported from the first browser to be imported into a second browser in accordance with the first operating command to export the user information, and the second operating command is a command to import the user information to the second browser; the step B comprising steps of: B1. selecting an exporting position for the user information; B2. exporting the user information to the exporting position and controlling the exported user information by the second operating command to be imported to the second browser from an importing position, and the importing position is corresponding to the exporting position; after step B2, the method comprising step of: B5. modifying a property of the exported user information to be Read-Only.

A method for sharing user information in browsers of a mobile terminal, and the method comprises steps of: A. receiving a first operating command for exporting user information from a first browser and the user information being stored in the first browser; B. executing a second operating command to control the user information exported from the first browser to be imported into a second browser, and the second operating command is a command to import the user information to the second browser.

A method for sharing user information in browsers of a mobile terminal, comprising steps of: A. receiving a second operating command for importing the user information to a second browser; B. executing a first operating command to export the user information from the first browser in accordance with the second operating command for importing the user information to the second browser and the first operating command is a command to export the user information from the first browser.

An apparatus for sharing user information in browsers of a mobile terminal, and the apparatus comprises: a transceiver module configured for receiving a first operating command for exporting user information from a first browser and the user information is stored in the first browser; a sharing module configured for executing a second operating command to control the user information exported from the first browser to be imported into a second browser, and the second operating command is a command to import the user information to the second browser.

An apparatus for sharing user information in browsers of a mobile terminal, comprising: a transceiver module configured for receiving a second operating command for importing the user information to a second browser; a sharing module configured for executing a first operating command to export the user information from the first browser in accordance with the second operating command for importing the user information to the second browser and the first operating command is a command to export the user information from the first browser.

By comparing to the current technique, in the present invention, the user information is exported from the first browser and imported to the second browser, so the user information can be shared between two browsers. In other word, the second browser can use the user information saved in the first browser to log in one website or one application without inputting the user information again. The login time for the user to use different browsers to browse the web pages or log in the application and the login procedure is simplified.

DETAILED DESCRIPTION OF THE PREFERRED EMBODIMENTS

Figure 1:
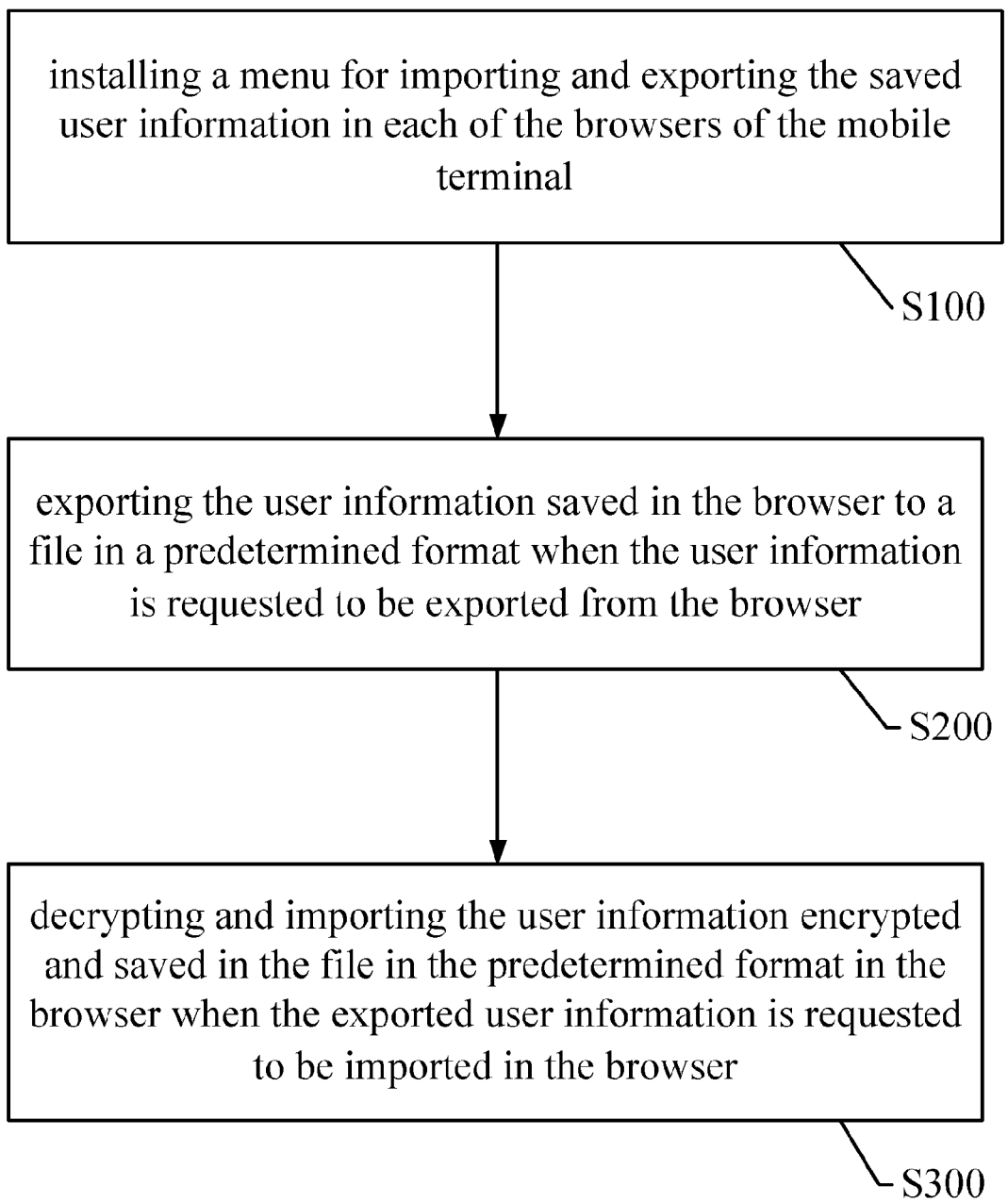
FIG. 1 is a flow chart illustrating a method for sharing user information in browsers of a mobile terminal in one embodiment of the present invention.

The above-mentioned description of the present invention can be best understood by referring to the following detailed description of the preferred embodiments and the accompanying drawings.

A method for sharing user information in browsers of a mobile terminal in accordance with one embodiment of the present invention comprises the following steps:

In step A, it is to receive a first operating command for exporting user information from a first browser and the user information is stored in the first browser.

In step B, it is to execute a second operating command to control the user information exported from the first browser to be imported into a second browser, and the second operating command is a command to import the user information to the second browser.

In the present embodiment, because the user information is exported from the first browser and imported to the second browser, the user information can be shared between the two browsers. The second browser can use the user information saved in the first browser to log in a website or application without inputting the user information again. It saves a lot of login time for the user to browse websites by different browsers or use the applications and simplifies the login procedure.

Amongst, the step B comprises the following steps:

In step B1, it is to select an exporting position for the user information.

In step B2, it is to export the user information to the exporting position and the exported user information is controlled by the second operating command to be imported to the second browser from an importing position, and the importing position is corresponding to the exporting position.

In the present embodiment, the corresponding exporting position is chosen before exporting the user information. Therefore, the user information can be saved in a more secure and safe position to prevent the user information being leaked out.

Amongst, before step B2, the method comprising step of:

In step B3, it is to select an exporting format of the user information.

The step B2 is to export the user information in accordance with the exporting format to the exporting position from the first browser and the exported user information is controlled by the second operating command to be imported to the second browser from the exporting position and the importing position is corresponding to the exporting position.

In the present embodiment, the user information is exported in an exporting format selected from the user and the exporting format can be predetermined. Therefore, the user information can be exported to be a file corresponding to the exporting format in accordance with a practical request. It is advantageous that the user information can only be decoded by specific decoding software and it is advantageous to secure the exported user information and the user information is not easy to be leaked out.

In the present invention, because the user information is encoded before exporting the user information, it is more efficiency to secure the user information to prevent the user information being leaked out.

Amongst, before step B2, the method further comprises the following step:

In step B4, it is to encrypt the user information;

The step B2 is to export the encrypted user information in accordance with the exporting format to the exporting position from the first browser and the exported user information is controlled by the second operating command to be decrypted and imported to the second browser.

Amongst, after step B2, the method further comprises the following step:

In step B5, it is to modify a property of the exported user information to be Read-Only.

In the present embodiment, because the property of the user information is set to be Read-Only before being imported to the second browser (after being exported from the first browser), it is to prevent the user information being modified. It is advantageous that the user information imported to the second browser is correct and can be used.

In addition, a method for sharing user information in browsers of a mobile terminal in one embodiment of the present and comprises steps of:

In step A, it is to receive a second operating command for importing the user information to a second browser;

In step B, it is to execute a first operating command to export the user information from the first browser in accordance with the second operating command for importing the user information to the second browser and the first operating command is a command to export the user information from the first browser.

In the present embodiment, because the user information is exported from the first browser and imported to the second browser, the user information can be shared between the two browsers. The second browser can use the user information saved in the first browser to log in website or application without inputting the user information again. It saves a lot of login time for the user to browse websites by different browsers or use the applications and simplifies the login procedure.

Amongst, the step B comprises steps of:

In step B1, it is to select an importing position for the user information;

In step B2, it is to import the user information from the importing position to the second browser and the user information is controlled by the first operating command to be exported to an exporting position from the first browser and the exporting position is corresponding to the importing position.

In the present embodiment, the corresponding exporting position is chosen before exporting the user information. Therefore, the user information can be saved in a more secure and safe position to prevent the user information being leaked out.

Amongst, after step B2, the method further comprises steps of:

In step B3, it is to read an importing format of the user information;

The step B2 is to import the user information in the importing format from the importing position to the second browser and the user information is controlled by the first operating command to be exported to the exporting position from the first browser and the exporting position is corresponding to the importing position.

In the present embodiment, the user information is exported in an exporting format selected from the user and the exporting format can be predetermined. Therefore, the user information can be exported to be a file in the corresponding exporting format in accordance with a practical request. It is advantageous that the user information can only be decoded by specific decoding software and it is advantageous to secure the exported user information and the user information is not easy to be leaked out.

Amongst, after step B2, the method further comprises steps of:

In step B4, it is to decrypt the user information;

The step B2 is to import the decrypted user information from the importing position to the second browser in the importing format and the user information is controlled by the first operating command to be encrypted and exported to the exporting position.

In the present invention, because the user information is encoded before exporting the user information, it is more efficiency to secure the user information to prevent the user information being leaked out.

Amongst, before step B2, the property of the user information is Read-Only.

In the present embodiment, because the property of the user information is set to be Read-Only before being imported to the second browser (after being exported from the first browser), it is to prevent the user information being modified. It is advantageous that the user information imported to the second browser is correct and can be used.

An apparatus for sharing user information in browsers of a mobile terminal is disclosed in one embodiment of the present invention and comprises:

A transceiver module is configured for receiving a first operating command for exporting user information from a first browser and the user information is stored in the first browser;

A sharing module is configured for executing a second operating command to control the user information exported from the first browser to be imported into a second browser, and the second operating command is a command to import the user information to the second browser.

In the present embodiment, because the user information is exported from the first browser and imported to the second browser, the user information can be shared between the two browsers. The second browser can use the user information saved in the first browser to log in website or application without inputting the user information again. It saves a lot of login time for the user to browse websites by different browsers or use the applications and simplifies the login procedure.

Amongst, the sharing module is further configured for selecting an exporting position for the user information and exporting the user information to the exporting position and the exported user information is controlled by the second operating command to be imported to the second browser from the importing position and the importing position is corresponding to the exporting position.

In the present embodiment, the corresponding exporting position is chosen before exporting the user information. Therefore, the user information can be saved in a more secure and safe position to prevent the user information being leaked out.

Amongst, the sharing module is further configured for selecting an exporting format of the user information and exporting the user information to the exporting position and the exported user information is controlled by the second operating command to be imported to the second browser from the exporting position and the importing position is corresponding to the exporting position.

In the present embodiment, the user information is exported in the predetermined exporting format. Therefore, the user information can be exported to be a file corresponding to the exporting format in accordance with a practical request. It is advantageous that the user information can only be decoded by specific decoding software and it is advantageous to secure the exported user information and the user information is not easy to be leaked out.

Amongst, the sharing module is further configured for encrypting the user information and exporting the encrypted user information in accordance with the exporting format to the exporting position from the first browser and the exported user information is controlled by the second operating command to be decrypted and imported to the second browser.

In the present invention, because the user information is encoded before exporting the user information, it is more efficiency to secure the user information to prevent the user information being leaked out.

Amongst, the sharing module is further configured for modifying a property of the exported user information to be Read-Only.

In the present embodiment, because the property of the user information is set to be Read-Only before being imported to the second browser (after being exported from the first browser), it is to prevent the user information being modified. It is advantageous that the user information imported to the second browser is correct and can be used.

In addition, an apparatus for sharing user information in browsers of a mobile terminal is disclosed in one embodiment of the present invention and comprises:

A transceiver module is configured for receiving a second operating command for importing the user information to a second browser;

A sharing module is configured for importing the user information to the second browser and the user information is exported from the first browser in accordance with the first operating command and the first operating command is a command to export the user information from the first browser.

In the present embodiment, because the user information is exported from the first browser and imported to the second browser, the user information can be shared between the two browsers. The second browser can use the user information saved in the first browser to log in website or application without inputting the user information again. It saves a lot of login time for the user to browse websites by different browsers or use the applications and simplifies the login procedure.

Amongst, the sharing module is further configured for selecting an importing position for the user information and importing the user information from the importing position to the second browser and the user information is controlled by the first operating command to be exported to an exporting position from the first browser and the exporting position is corresponding to the importing position.

In the present embodiment, the corresponding exporting position is chosen before exporting the user information. Therefore, the user information can be saved in a more secure and safe position to prevent the user information being leaked out.

Amongst, the sharing module is further configured for reading an importing format of the user information and importing the user information in the importing format from the importing position to the second browser and the user information is controlled by the first operating command to be exported to the exporting position from the first browser and the exporting position is corresponding to the importing position.

In the present embodiment, the user information is exported by the predetermined exporting format. Therefore, the user information can be exported to be a file corresponding to the exporting format in accordance with a practical request. It is advantageous that the user information can only be decoded by specific decoding software and it is advantageous to secure the exported user information and the user information is not easy to be leaked out.

Amongst, the sharing module is further configured for decrypting the user information and importing the decrypted user information from the importing position to the second browser in the importing format and the user information is controlled by the first operating command to be encrypted and exported to the exporting position.

Amongst, a property of the user information is Read-Only.

In the present embodiment, because the property of the user information is set to be Read-Only before being imported to the second browser (after being exported from the first browser), it is to prevent the user information being modified. It is advantageous that the user information imported to the second browser is correct and can be used.

As shown in FIG. 1, FIG. 1 is a flow chart illustrating a method for sharing user information in browsers of a mobile terminal in one embodiment of the present invention. The method for sharing user information in browsers of a mobile terminal in the present embodiment includes the following steps:

In step S100, it is to install a menu for importing and exporting the saved user information in each of the browsers of the mobile terminal. For example, a first menu is installed in the first browser and a second menu is installed in the second browser. Both of the first browser and the second browser can be used to import and export the user information. The first menu and the second menu can be used to response a corresponding trigger signal generated by a touch operation from the user.

Amongst, the mobile terminal described in the present embodiment is a cellular phone and the user information is a user account and a corresponding password saved by the browser, such as a user email account and a corresponding password, Twitter account and password and so on.

The present embodiment implements a "saving a user account and a corresponding password" function in the browser of the cellular phone and a menu for importing and exporting the saved user information, which is installed in each of the browsers. For example, the menus include a function for importing the saved user information and a function for exporting the saved user information.

In step S200, it is to export the user information saved in the browser to be a file in a predetermined format when the user information is requested to be exported from the browser and the browser receives the operating command of the user from the menu and the file is saved and encrypted.

In the present embodiment, for the file with the user information can be imported and exported in any browsers, the file exported in the same predetermined format, such as .html or .txt, is encrypted and stored and each browser is requested to read and write the content thereof in the same predetermined format.

The user information in the browser used in the present embodiment is saved in the predetermined format and exported to an assigned directory to be encrypted and saved. Because the saved user account and the corresponding password are belonged to user privacy, they cannot be read and modified by another user. Therefore, when the user account and the corresponding password in the browser are exported to the assigned directory, the file is requested to be encrypted and the file, such as .html or .txt, is guaranteed to be set as Read-Only file, which cannot be read or modified by another user. Amongst, the unified encrypting algorithm is used to do the encryption.

In step S300, it is to decrypt and import the user information encrypted and saved in the file in the predetermined format into the browser when the exported user information is requested to be imported in the browser, and the browser receives the operating command of the user from the menu.

In the present embodiment, when other browser imports the exported user information, the exported file is requested to be decrypted first and the decrypting method uses a unified standard in each of the browsers. When the user account and the corresponding password are read from the exported file, each of the user information is read and compared with the saved user account and the corresponding password in the current browser. If the user information has been saved, the user information can be ignored. If the user information has not been saved, the user information is added.

The method for sharing the user information in the browsers of the mobile terminal in the present invention is further described in accordance with the following practical embodiment.

Figure 2:
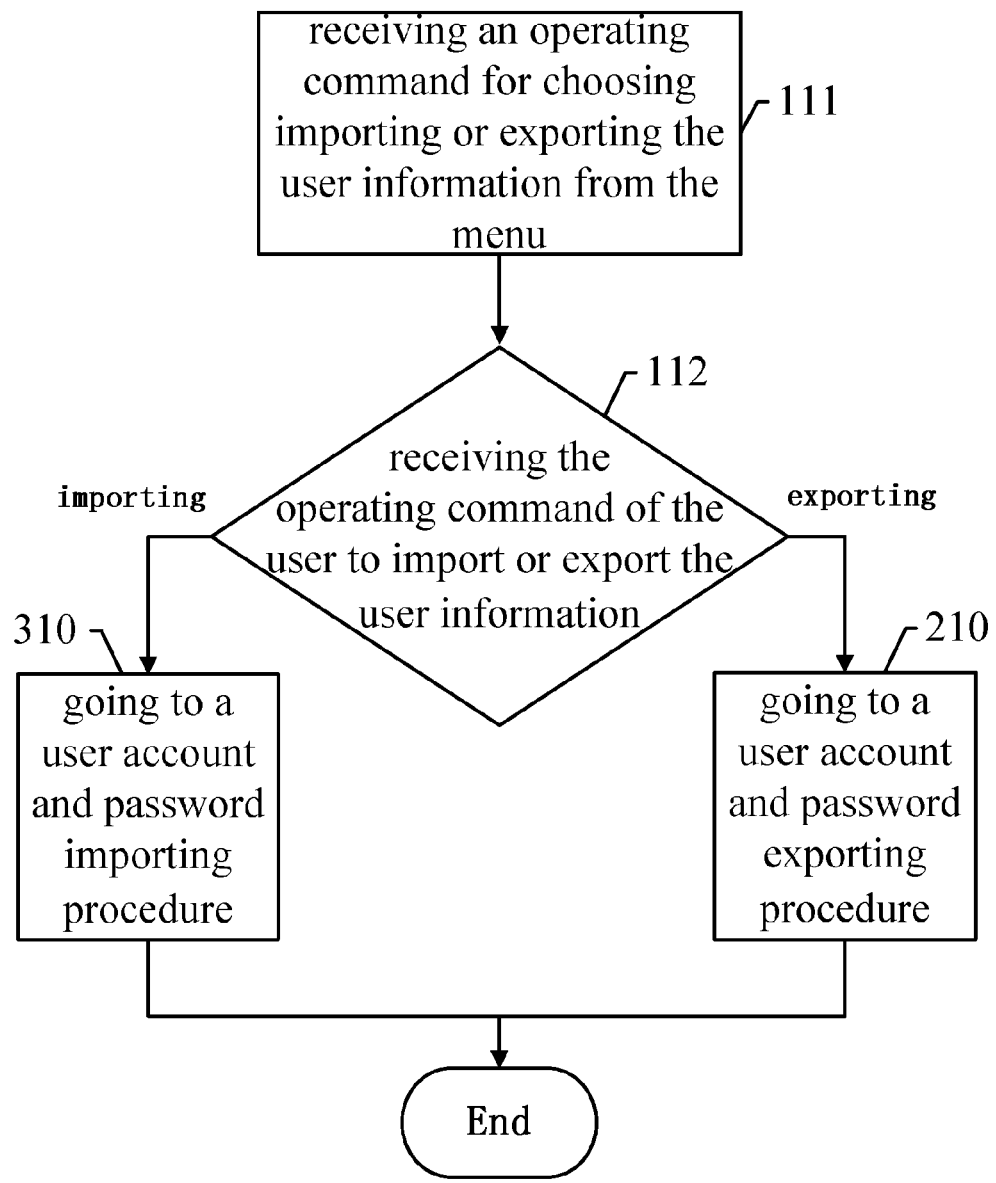
FIG. 2 is a flow chart illustrating the method for sharing the user information in the browsers of the mobile terminal in the present invention.

As shown in FIG. 2, FIG. 2 is a flow chart illustrating the method for sharing the user information in the browsers of the mobile terminal in the present invention and includes the following steps:

In step 111, it is to receive an operating command for importing or exporting the user information in browsers, and it is to choose importing or exporting the user information from the menu.

In step 112, it is to receive the operating command of the user to import or export the user information. When the importing is chosen, it is going to step 210, and when the exporting is chosen, it is going to step 310;

In step 210, it is going to a user account and password exporting procedure and it is done when the exporting is finished.

In step 310, it is going to a user account and password importing procedure and it is done when the importing is finished.

Figure 3:
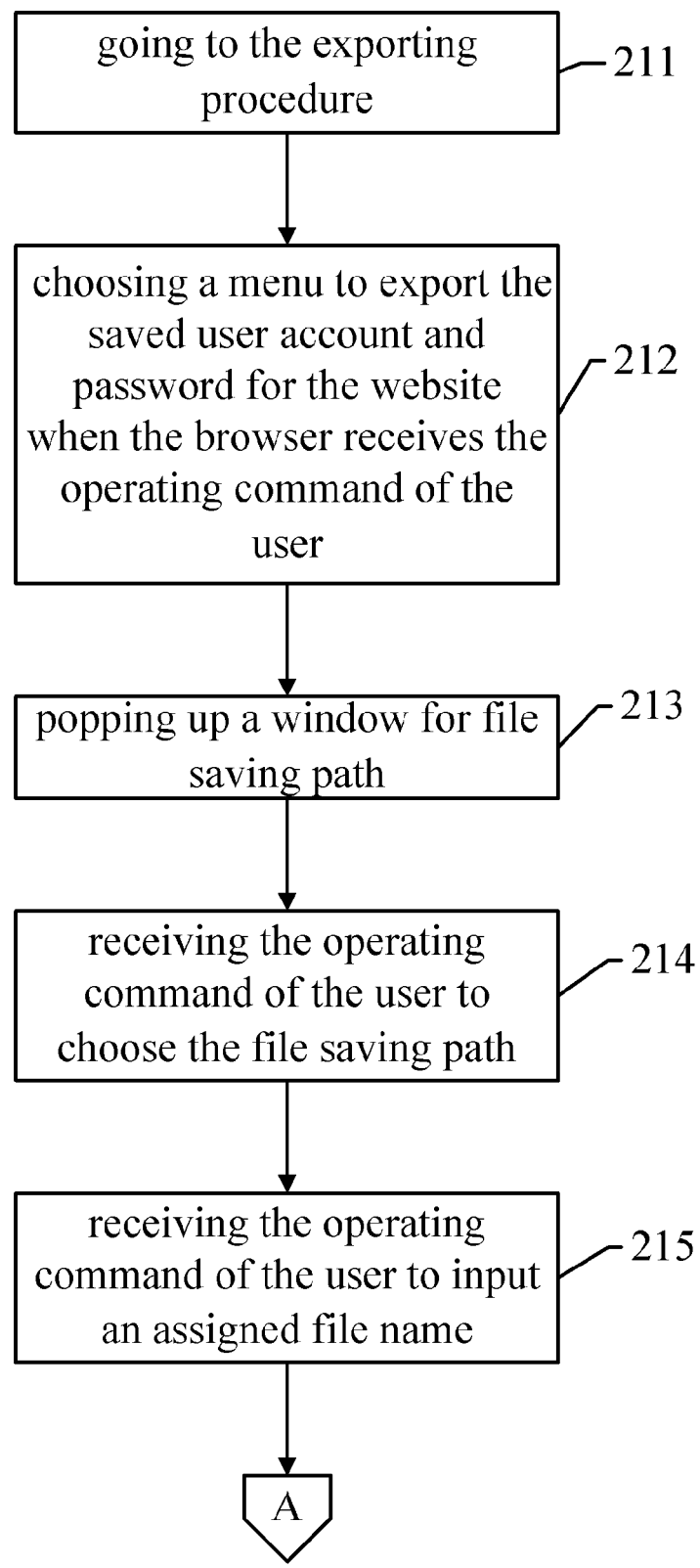
FIG. 3 is a flow chart illustrating the method for sharing the user information in the browsers of the mobile terminal to export the user account and password in the present invention.
Figure 3:
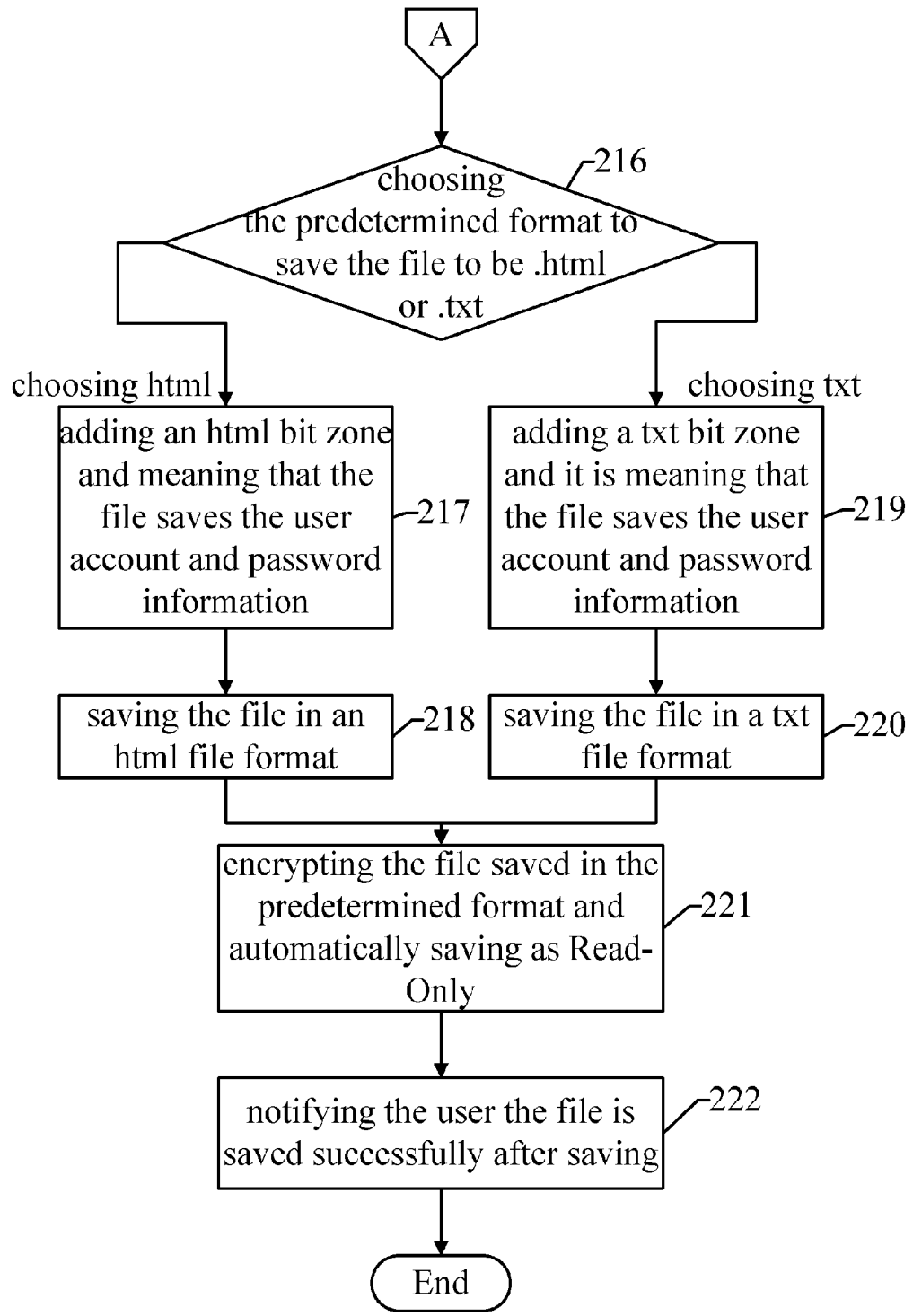

Amongst, in step 210, it is going to the procedure for importing the user account and password shown in FIG. 3 and the method for importing the user account and the corresponding password in the embodiment of the present invention includes:

In step 211, it is to go to the exporting procedure when the saved user information is requested to be exported from the browser.

In step 212, it is to choose a menu to export the saved user account and password for the website when the browser receives the operating command of the user.

In step 213, it is to pop up a window for a file saving path from the menu of the browser, where the exported user information is saved.

In step 214, it is to receive the operating command of the user to choose the file saving path, which is a path chosen by the user to save the file.

In step 215, it is to receive the operating command of the user to input an assigned file name, such as a browser account file.

In step 216, it is to receive the operating command of the user to choose the predetermined format to save the file, which is a filename extension of the file, such as .html or .txt. When the .html format is chosen, it is going to step 217, and when the .txt format is chosen, it is going to step 219.

In step 217, it is to add an html bit zone and it is meaning that the file saves the user account and the corresponding password and it is going to step 218.

In step 218, it is to save the file in an html file format and it is going to step 221.

In step 219, it is to add a txt bit zone and it is meaning that the file saves the user account and the corresponding password and it is going to step 220.

In step 220, it is to save the file in a txt document format and it is going to step 221.

The predetermined file format is chosen and accomplished in the steps 217, 218, 219 and 220, and the user information for each website in the browser adds the corresponding bit zone to save in the file in a predetermined file format.

In step 221, it is to encrypt the file saved in the predetermined format and automatically saved as a Read-Only file. Therefore, the security is enhanced and any other users cannot read the file without password.

In step 222, after saving the file, it is to notify the user the file is saved successfully and the exporting procedure is finished.

Amongst, when the user account and the corresponding password saved for the browser are requested to be exported, the file must be saved in the .html or .txt document. In order for the browser to recognize the file with the user account and the corresponding password, a specific tag is added in a file header when writing in the file to represent that the file is used for saving the user account and the corresponding password. Every record in the file is requested to save three kinds of information, website information, the corresponding user account and the corresponding password. For example, the .html file is described as the following:

```
<html>
<TITLE>user account and password</TITLE>
<H1>user account and password</H1>
<dl>
<DT><A HREF="http:// http://mail.cn.yahoo.com/">
Yahoo </A> </DT>
<DD>Zhangsan@yahoo.com</DD>
<DD> yahoo123 </DD>
</dl>
<HR>
<dl>
<DT> A
HREF="http://weibo.com/?c=spr_web_sq_baidub_weibo_t001/">Sina
Weibo </A> </DT>
<DD>lisiyy</DD>
<DD>mk123</DD>
</dl>
. . .
</html>
```

Amongst, the title is a saving user account and password tag. The hyperlink in <DT> is a bit zone of the user information. The content in the first <DD> contains the user account and the content in the second <DD> contains the corresponding password.

If the file is a .txt document, the file can be completely written in word description but the file is requested to be saved and encrypted.

Figure 4:
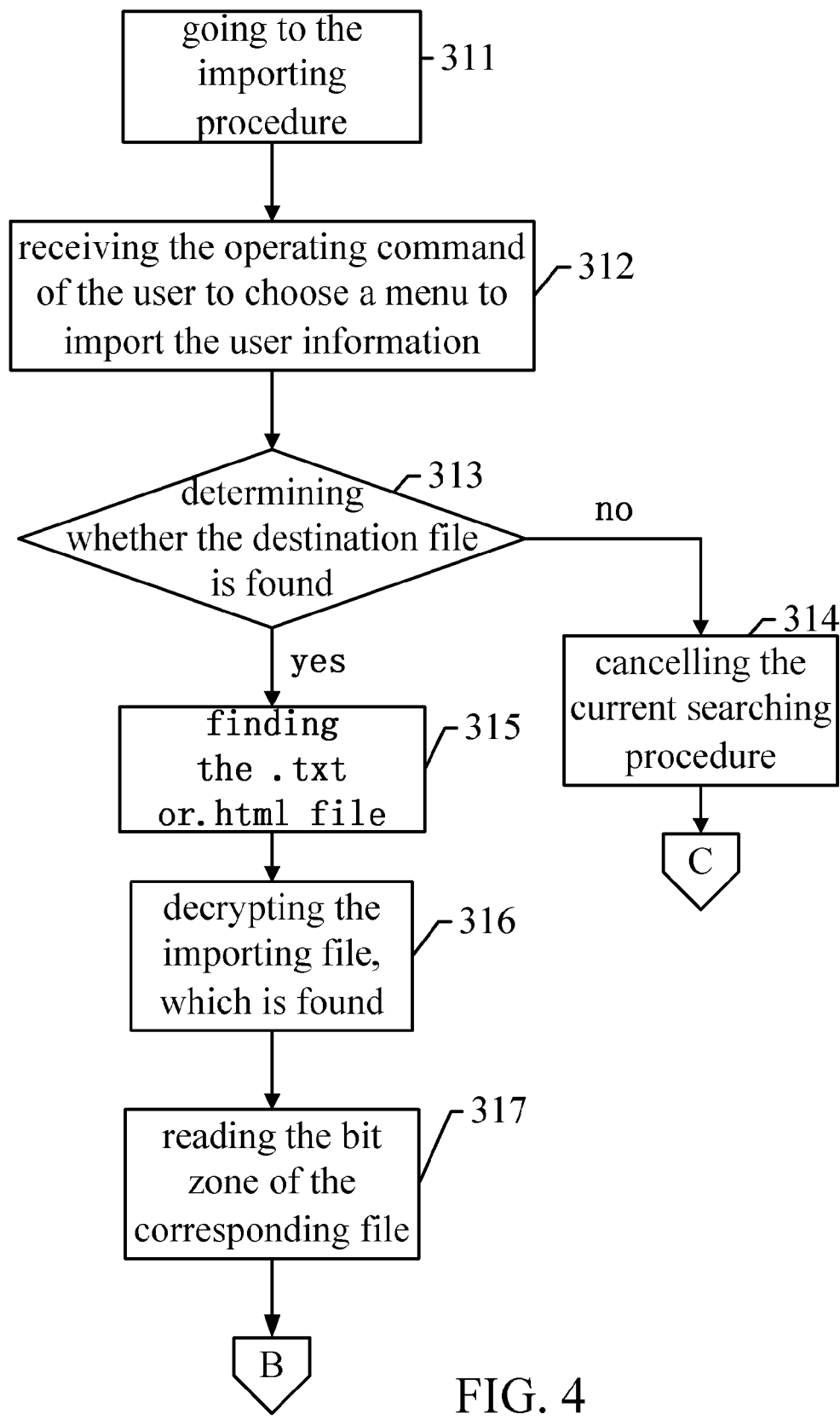
FIG. 4 is a flow chart illustrating the method for sharing the user information in the browsers of the mobile terminal to import the user account and password in the present invention.
Figure 4:
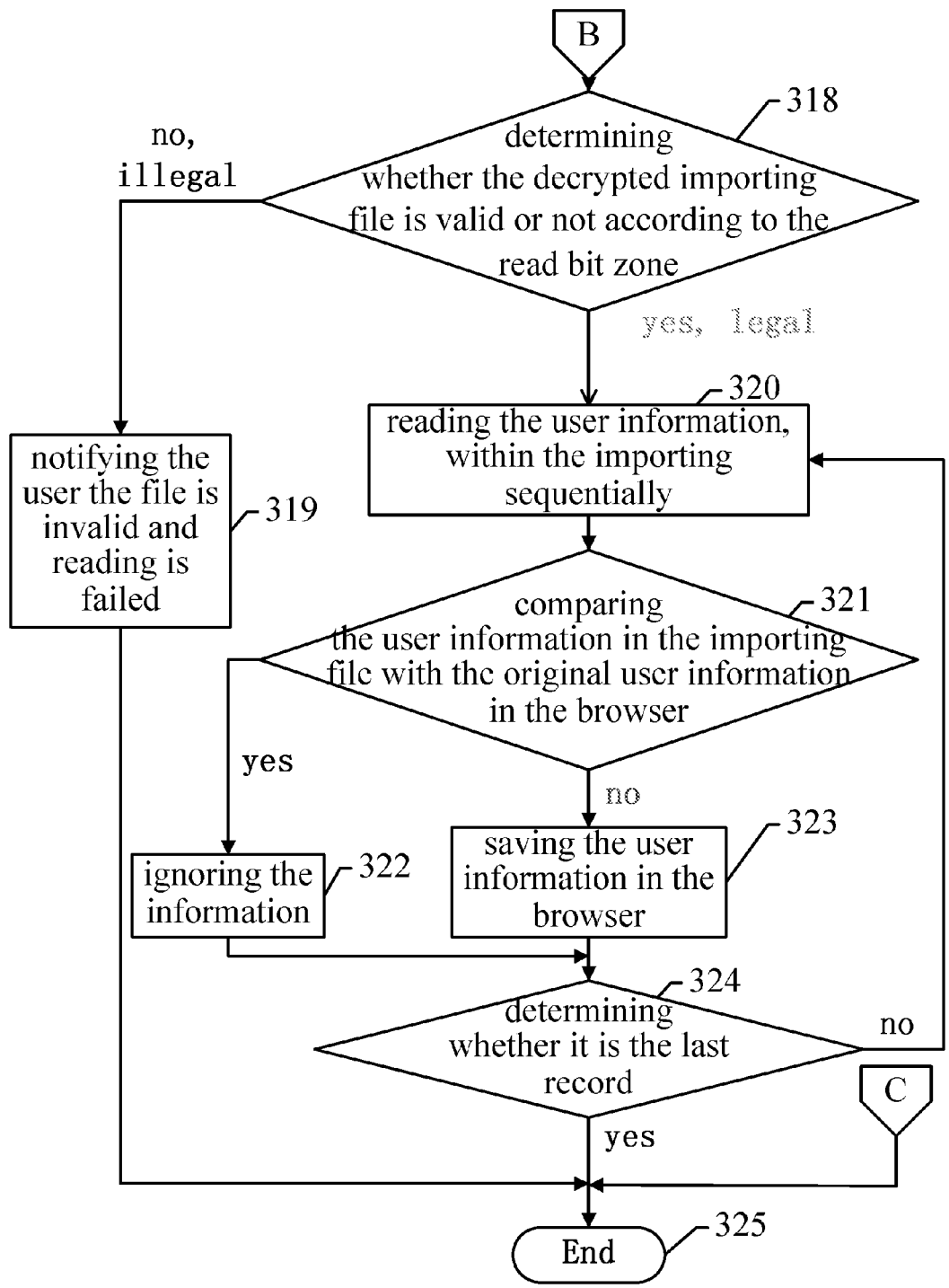

The exporting procedure in the present embodiment is described above and the step 300 regarding the procedure to import the user account and the corresponding password is shown in FIG. 4.

In step 311, it is going to an importing procedure.

In step 312, it is to receive the operating command of the user to choose a menu to import the user information and a file path finding window is popped up to choose the corresponding importing file and it is going to step 313.

In step 313, it is to determine whether the destination file is found, if no, then it is going to step 314, and if yes, then it is going to step 315.

The steps described above are to accomplish to import the exported user information in the browser. The menu to import the saved user information is chosen by the operating command of the user received by the browser. The encrypting file in the predetermined format for the user information is searched according to the menu to import the saved user information and the file is the importing file.

In step 314, it is to cancel the current searching procedure when the destination file is not found and it is going to step 315.

In step 315, when the .html or .txt document is found, it means the importing file is found and it is going to step 316.

In step 316, it is to decrypt the importing file, which is found, and it is going to step 317.

In step 317, it is to read the bit zone of the corresponding file.

In step 318, it is to determine whether the decrypted importing file is valid or not according to the read bit zone. If no, then it is going to step 319, and if yes, then it is going to step 320.

In step 319, the decrypted importing file is determined to be invalid, and it is to notify the user that the file is invalid and the reading is failed. It is going to step 325.

In step 320, when the decrypted importing file is determined to be valid, the user information, which includes the user account and the corresponding password for the website, within the importing file is read sequentially and it is going to step 321.

In step 321, it is to compare the user information in the importing file with the original user information in the browser and it is to determine whether the user information in the importing file is the same as the user information in the browser and whether the read user account and the corresponding password for the website has been saved in the browser. If yes, then it is going to step 322, and if no, then it is going to step 323.

In step 322, it is to ignore the information and it is going to step 324.

In step 323, it is to save the user information in the browser and the read user account and the corresponding password for the website is saved in the browser and it is going to step 324.

In step 324, it is to determine whether it is the last record, and if no, then returns to step 320 and if yes, it is going to step 325.

In step 325, it is to finish the importing procedure.

In the present practical embodiment, when the new user account and the corresponding password is imported from one file in one browser, it is to avoid saving the same information repeatedly because some of the user accounts and the corresponding passwords have been saved in the browser. It is going to determine whether the user information for one website has been saved or not and it is not going to determine the practical user account and the corresponding password. For example, a yahoo user email login account "Zhangsan@yahoo.com" and a corresponding password "yahoo123" are saved in one browser, but the yahoo user email account "Lisi@yahoo.com" and the corresponding password "yahoo345" are saved in the importing file. In the present embodiment, the bit zones are all determined to be the yahoo user email login website and both of information is the same. The user information for the website saved in the importing file is not saved in the browser and the information is ignored.

Figure 5:
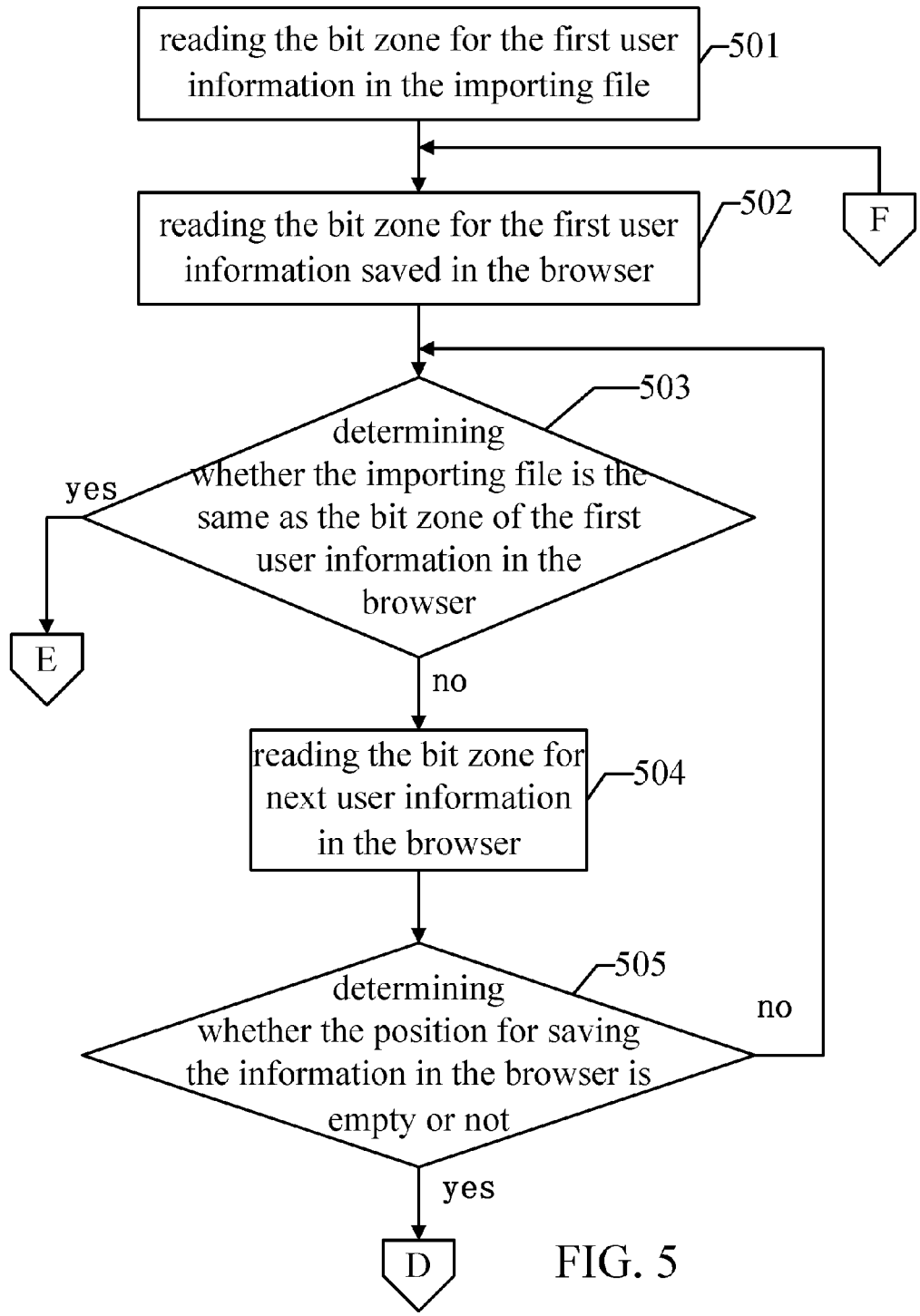
FIG. 5 is a flow chart illustrating the method for sharing the user information in the browsers of the mobile terminal to import the user account and password in the present invention.
Figure 5:
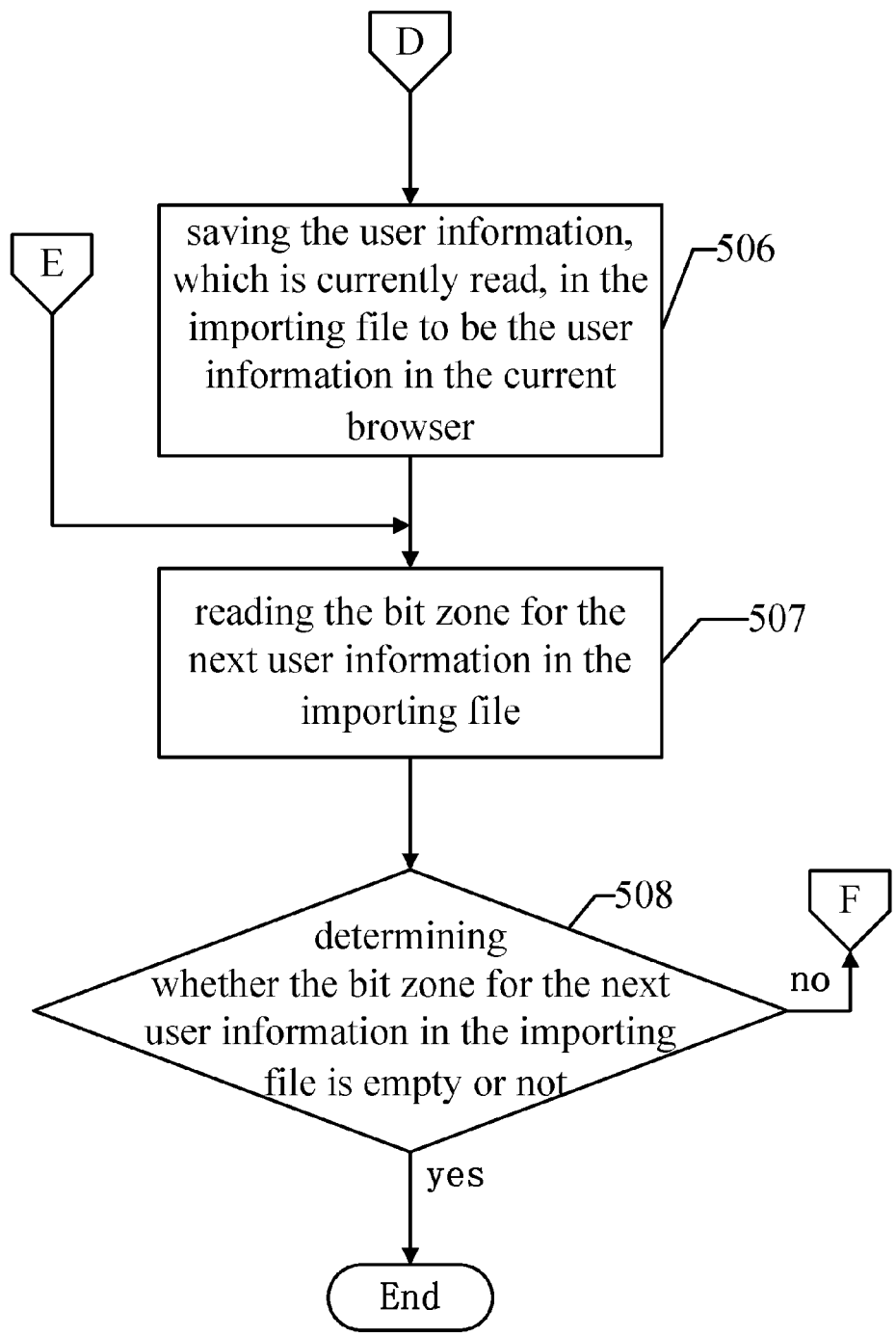

Because all of the records in both of the files are requested to be compared, the user information in the importing file is compared with the information saved in the browser. If the information saved in the browser didn't include one of the user information in the file, the user information in the importing file can be saved in the browser. Therefore, it is requested to include two loops to control the comparing procedure. The large loop is to read the information in the importing file and the small loop is to read the information saved in the browser. When the small loop is finished and there is no match, the information in the importing file is saved and the practical procedure is shown in FIG. 5.

In step 501, it is to read the bit zone of the first user information in the importing file and it is going to step 502.

In step 502, it is to read the bit zone of the first user information saved in the browser and it is going to step 503.

In step 503, it is to determine whether the bit zone of the first user information in the importing file is the same as the bit zone of the first user information in the browser. If no, then it is going to step 504, and if yes, then it is going to step 507.

In step 504, it is to read the bit zone of next user information in the browser.

In step 505, it is to determine whether the position for saving the information in the browser is empty or not (it is to determine whether the last user information in the browser is read or not). If not, then returns to step 503, and if yes, then it is going to step 506.

In step 506, it is to save the user information, which is currently read, in the importing file to be the user information in the current browser. It is to save the user account and the corresponding password in the current browser and it is going to step 507.

In step 507, it is to read the bit zone of the next user information in the importing file and it is going to step 508.

In step 508, it is to determine whether the bit zone of the next user information in the importing file is empty or not. If yes, then the procedure is finished, and if no, then returns to step 502.

Amongst, the predetermined format of the file is the .html or .txt document, and the user information includes the user account and the corresponding password for the website.

Accordingly, according to the method for sharing the user information in the browsers of the mobile terminal in the previous embodiments provided in the present invention, it is to accomplish the importing and exporting function for the user account and the corresponding password among different browsers. The user can synchronize the user account and the corresponding password among the browsers in accordance to his request. The new information is added and the original information won't be overwritten. The user only needs to execute such a silly operation to do the importing and exporting. It is simple and practical and brings a lot of convenience for the user.

Figure 6:
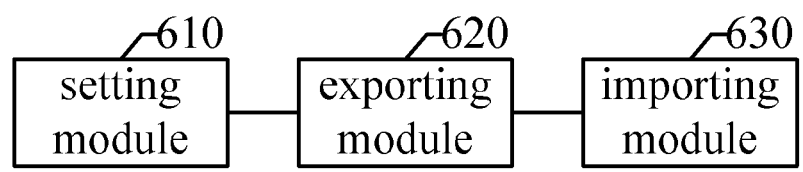
FIG. 6 is a block diagram illustrating a mobile terminal in a preferred embodiment of the present invention.

According to the embodiments described above, an embodiment for a mobile terminal is provided in the present invention as shown in FIG. 6. The mobile terminal in the present embodiment includes:

A setting module 610 is configured for adding a menu for importing and exporting the user information in each of the browsers of the mobile terminal. The detail is described as the previous step S100.

An exporting module 620 is configured for exporting the user information saved in the browser to be saved and encrypted in a file in a predetermined format when it is requested to export the user information in the browser and the browser receives the operating command of the user from the menu. The detail is described as the previous step S200.

An importing module 630 is configured for decrypting and importing the encrypted user information saved in the file in the predetermined format to the browser when it is requested to import the exported user information to the browser and the browser receives the operating command of the user from the menu. The detail is described as the previous step S300.

Amongst, the file in the predetermined format is the .html or .txt document, and the user information includes the user account and the corresponding password for the website.

Figure 7:
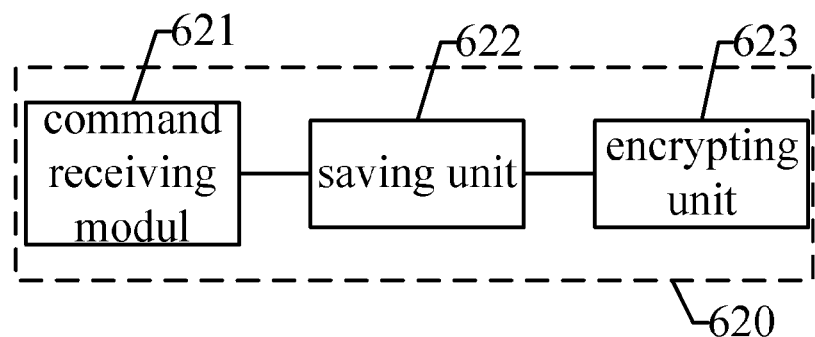
FIG. 7 is a block diagram illustrating an exporting module in the preferred embodiment of the present invention.

Preferably, as shown in FIG. 7, the exporting module includes:

A command receiving module 621 is configured for choosing the menu to export the saved user account and the corresponding password for the website when the saved user information is requested to be exported and the browser receives the operating command of the user. The detail thereof is described as the previous steps 211 to 216.

A saving unit 622 is configured for saving the user information in each website on the browser with the corresponding bit zone to be a file in a predetermined format. The detail is described as the previous steps 217 and 218 and steps 219 and 220.

An encrypting unit 623 is configured for encrypting the saved file in the predetermined format and automatically saving the file to be a Read-Only file. The detail is described as the previous step 221.

Figure 8:
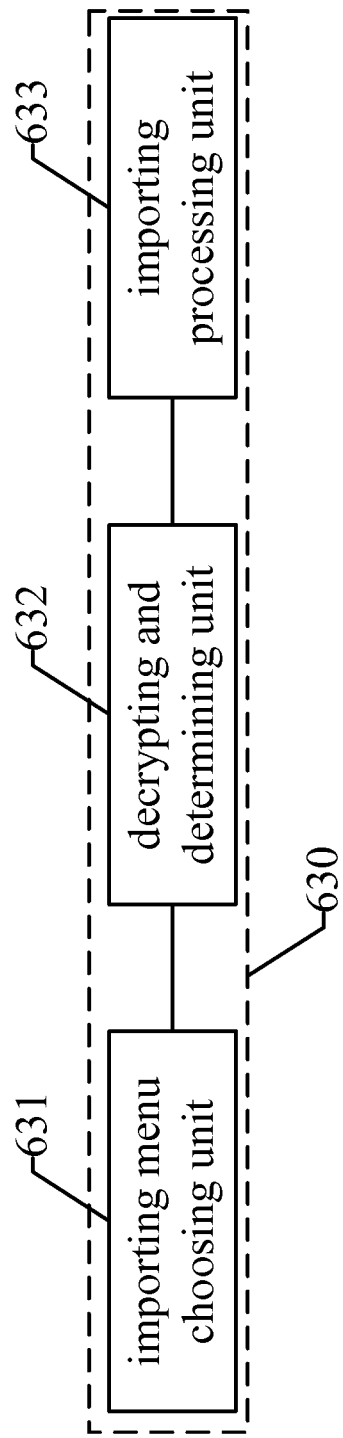
FIG. 8 is a block diagram illustrating an importing module in the preferred embodiment of the present invention.

Preferably, as show in FIG. 8, the importing module 630 comprises:

An importing menu choosing unit 631 is configured for choosing the menu to import the saved user information when the browser is requested to import the exported user information and receives the operating command of the user. The user information in the encrypted file in the predetermined format is searched by choosing the menu to import the saved user information and the encrypted file is the importing file. The detail is described as the previous steps 311 to 315.

A decrypting and determining unit 632 is configured for decrypting the importing file and reading the corresponding bit zone. The decrypting and determining unit 632 is further configured for determining whether the decrypted importing file is valid or not. The detail is described as the previous steps 316 to 318.

An importing processing unit 633 is configured for sequentially reading the user account and the corresponding password for the website in the importing file when the decrypted importing file is valid and also determining whether the user account and the corresponding password for the website have been saved in the browser. If no, then the user account and the corresponding password for the website are saved in the browser. The detail is described as the previous steps 319 to 325.

Figure 9:
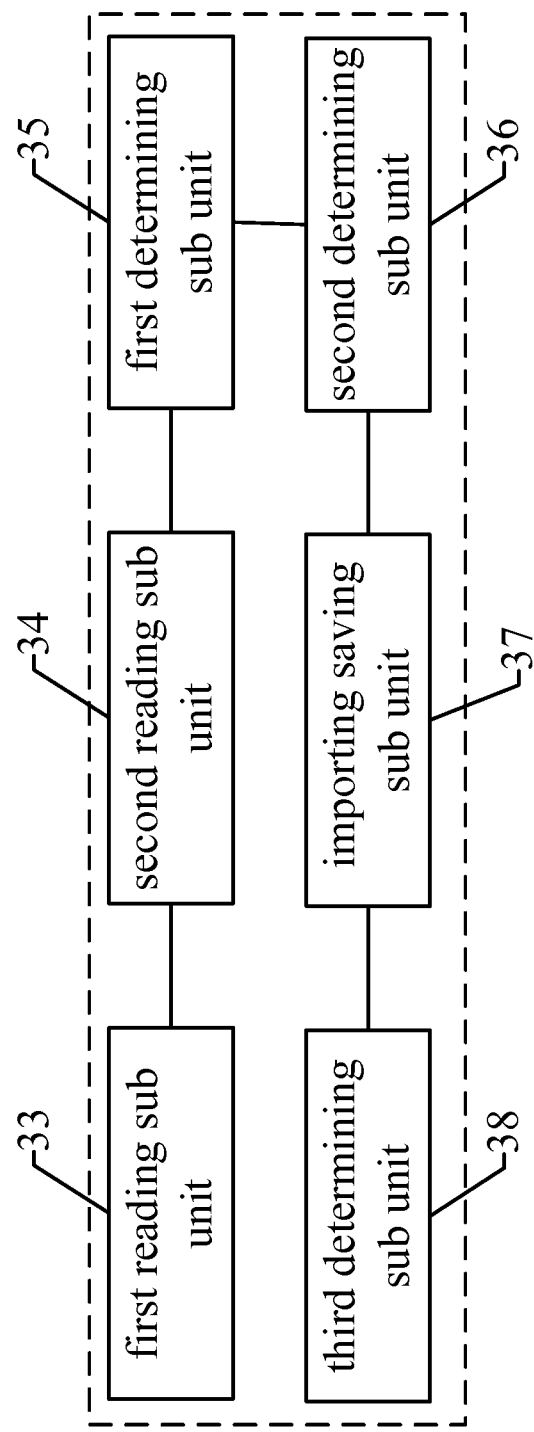
FIG. 9 is a block diagram illustrating an importing processing unit of the importing module in the preferred embodiment of the present invention.

Preferably, as shown in FIG. 9, the importing processing unit 633 comprises:

A first reading sub unit 33 is configured for reading the bit zone of the first user information in the importing file. The detail is described as the previous step 501.

A second reading sub unit 34 is configured for reading the bit zone of the saved first user information in the browser. The detail is described as the previous step 502.

A first determining sub unit 35 is configured for determining whether the bit zone of the first user information in the importing file is the same as the bit zone of the saved first user information in the browser is the same or not. The detail is described as the previous step 503.

A second determining sub unit 36 is configured for reading the bit zone of the next user information saved in the browser when both of the first user information in the importing file and the browser is not the same and determining whether the position for saving the information in the browser is empty or not. The detail is described as the previous steps 504 to 505.

The importing saving sub unit 37 is configured for saving the current read user information in the importing file to be the user information in the current browser. The detail is described as the previous step 506.

A third determining sub unit 38 is configured for reading the bit zone of the next user information in the importing file and determining whether the bit zone of the next user information in the importing file is empty or not when both of the first user information in the importing file and the browser is the same. The detail is described as the previous steps 507 and 508.

In summary, the method and apparatus for sharing the user information in the browsers of the mobile terminal is provided in the present invention to add a new function in the mobile terminal. It is to accomplish that the saved user account and the corresponding password for the website can be exported from a browser and the other browser can import and use the user account and the corresponding password saved by the user. The user can user many browsers at the same time and the great expedient manner can be achieved.

As described above, the present invention has been described with preferred embodiments thereof and it is understood that many changes and modifications to the described embodiments can be carried out without departing from the scope and the spirit of the invention that is intended to be limited only by the appended claims.

What is claimed is:

1. A method for sharing user passwords in browsers of a mobile terminal, comprising:
    A) installing a menu for importing and exporting saved user information, which includes user accounts and corresponding passwords for websites, in each of the browsers of the mobile terminal;
    B) exporting the user information saved in the browser to a file in a predetermined format and saving and encrypting the file when the user information is requested to be exported from the browser and the browser receives an operating command of the user from the menu;
    C) decrypting and importing the user information encrypted and saved in the file in the predetermined format into the browser when the exported user information is requested to be imported in the browser and the browser receives the operating command of the user from the menu;
    wherein Step C comprises:
    C1) choosing a menu to import the saved user information when the exported user information is requested to be imported in the browser and the operating command of the user is received through the browser, and finding an encrypted file having the user information in the predetermined format, which serves as an importing file, based on the chosen menu for importing the saved user information;
    C2) decrypting the importing file, which is found, and reading a corresponding bit zone, and determining whether the decrypted importing file is valid or not according to the read bit zone;
    C3) sequentially reading user accounts and passwords for websites, which are included in the importing file, when the decrypted importing file is determined to be valid; determining whether the read user accounts and passwords for the websites have been saved in the browser; if no, saving the user accounts and passwords for the websites in the browser;
    wherein Step C3 comprises:
    C31) reading the bit zone of a first user information in the importing file:
    C32) reading the bit zone of the first user information saved in the browser;
    C33) determine whether the read bit zone of the first user information in the importing file is the same as the bit zone of the first user information saved in the browser; going to Step C34 if no; going to Step C36 if yes;

C34) reading the bit zone of next user information saved in the browser and determining whether the position for saving the information in the browser is empty or not; going back to Step C33 if no going to Step C35 if yes;

C35) saving the user information, which is currently read, in the importing file to be the user information in the current browser and going to Step C36;

C36) reading the bit zone of the next user information in the importing file and determining whether the bit zone of the next user information in the importing file is empty or not ending the process if yes; going back to Step C32 if no.

2. The method for sharing the user passwords in the browsers of the mobile terminal according to claim 1, wherein Step B comprises:

B1) choosing a menu to export saved user accounts and passwords for websites when the saved user information is requested to be exported from the browser and the browser receives the operating command of the user, and choosing a path for saving the file and the predetermined format to save the file;

B2) adding a corresponding bit zone to the user information for each website in the browser and saving them in the file according to the chosen predetermined format;

B3) encrypting the file saved in the predetermined format and automatically saved as a Read-Only file.

3. The method for sharing the user passwords in the browsers of the mobile terminal according to claim 1, wherein the file in the predetermined format is an .html or .txt document.

4. A mobile terminal, comprising: a processor; and a memory connected with processor, the memory comprising a plurality of program instructions executable by the processor, the plurality of program instructions comprising:

a setting module for installing a menu for importing and exporting saved user information, which includes user accounts and corresponding passwords for websites, in each of the browsers of the mobile terminal;

an exporting module for exporting the user information saved in the browser to a file in a predetermined format and saving and encrypting the file when the user information is requested to be exported from the browser and the browser receives an operating command of the user from the menu;

an importing module for decrypting and importing the user information encrypted and saved in the file in the predetermined format into the browser when the exported user information is requested to be imported in the browser and the browser receives the operating command of the user from the menu;

wherein the importing module comprises: an importing menu choosing unit for choosing a menu to import the saved user information when the exported user information is requested to be imported in the browser and the operating command of the user is received through the browser, and finding an encrypted file having the user information in the predetermined format, which serves as an importing file, based on the chosen menu for importing the saved user information;

a decrypting and determining unit for decrypting the importing file, which is found, and reading a corresponding bit zone, and determining whether the decrypted importing file is valid or not according to the read bit zone;

an importing processing unit for sequentially reading user accounts and passwords for websites, which are included in the importing file, when the decrypted importing file is determined to be valid; determining whether the read user accounts and passwords for the websites have been saved in the browser; if no, saving the user accounts and passwords for the websites in the browser;

wherein the importing processing unit comprises:

a first reading sub unit for reading the bit zone of a first user information in the importing file;

a second reading sub unit for reading the bit zone of the first user information saved in the browser; a first determining sub unit for determine whether the read bit zone of the first user information in the importing file is the same as the bit zone of the first user information saved in the browser; a second determining sub unit for reading the bit zone of next user information saved in the browser and determining whether the position for saving the information in the browser is empty or not when the read bit zone of the first user information in the importing file is different from that saved in the browser;

an importing saving sub unit for saving the user information, which is currently read, in the importing file to be the user information in the current browser;

a third determining sub unit for reading the bit zone of the next user information in the importing file and determining whether the bit zone of the next user information in the importing file is empty or not when the read bit zone of the first user information in the importing file is the same as that saved in the browser.

5. The mobile terminal according to claim 4, wherein the exporting module comprises:

a command receiving module for choosing a menu to export saved user accounts and passwords for websites when the saved user information is requested to be exported from the browser and the browser receives the operating command of the user, and choosing a path for saving the file and the predetermined format to save the file;

a saving unit for adding a corresponding bit zone to the user information for each website in the browser and saving them in the file according to the chosen predetermined format;

an encrypting unit for encrypting the file saved in the predetermined format and automatically saved as a Read-Only file.

6. The mobile terminal according claim 4, wherein the file in the predetermined format is an .html or .txt document.

* * * * *